(12) United States Patent
Tamulewicz

(10) Patent No.: US 10,912,974 B2
(45) Date of Patent: Feb. 9, 2021

(54) BALL THROWING DEVICE

(71) Applicant: PetSmart Home Office, Inc., Phoenix, AZ (US)

(72) Inventor: Paul Tamulewicz, Glendale, AZ (US)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 0 days.

(21) Appl. No.: 16/787,284

(22) Filed: Feb. 11, 2020

(65) Prior Publication Data

US 2020/0306606 A1 Oct. 1, 2020

Related U.S. Application Data

(60) Provisional application No. 62/824,469, filed on Mar. 27, 2019.

(51) Int. Cl.
| | | |
|---|---|---|
| *F41B 3/00* | (2006.01) | |
| *A63B 65/12* | (2006.01) | |
| *A01K 15/02* | (2006.01) | |

(52) U.S. Cl.
CPC .......... *A63B 65/122* (2013.01); *A01K 15/025* (2013.01)

(58) Field of Classification Search
CPC ................ A63B 65/122; F16F 1/328
See application file for complete search history.

(56) References Cited

U.S. PATENT DOCUMENTS

| | | | | |
|---|---|---|---|---|
| 1,585,446 | A | | 5/1926 | Warwick |
| 3,284,842 | A | * | 11/1966 | Jennings, Jr. ......... E05D 11/082 16/386 |
| 3,841,292 | A | * | 10/1974 | Hoffman ................ F41B 3/04 124/5 |
| 4,076,004 | A | * | 2/1978 | Huelskamp ............. F41J 9/28 124/5 |
| D424,640 | S | | 5/2000 | Oblack |
| 6,076,829 | A | * | 6/2000 | Oblack .................. A63B 60/12 273/317 |
| 6,477,745 | B2 | | 11/2002 | Strebl |
| D484,938 | S | | 1/2004 | Tu |
| D554,717 | S | | 11/2007 | McKinnell |
| 7,686,001 | B2 | * | 3/2010 | Fitt ........................ A63B 59/20 124/5 |
| D630,277 | S | | 1/2011 | McKinnell |
| D640,338 | S | | 6/2011 | Oblack et al. |
| D655,359 | S | | 3/2012 | Thorogood |
| D666,686 | S | | 9/2012 | Burger |
| D674,851 | S | | 1/2013 | Osborne et al. |
| 8,517,003 | B2 | * | 8/2013 | Fisher .................. A01K 15/025 124/5 |
| 8,857,419 | B2 | * | 10/2014 | Hansen ................ A01K 15/025 124/5 |
| 8,984,736 | B2 | | 3/2015 | Radocy |
| D759,907 | S | | 6/2016 | Weinstein |

(Continued)

*Primary Examiner* — John A Ricci
(74) *Attorney, Agent, or Firm* — Fox Rothschild LLP

(57) ABSTRACT

A ball throwing device including a lower handle portion, a middle lever portion, and a head portion. The middle lever portion may include a plurality of latitudinal bends positioned between the lower handle portion and the head portion. Additionally and/or alternatively, the head portion may include a half-spherical cup configured to releasably retain a ball, the half-spherical cup having a plurality of edge lobes configured to flex over an outside diameter of the ball.

15 Claims, 5 Drawing Sheets

(56) References Cited

U.S. PATENT DOCUMENTS

| | | |
|---|---|---|
| 9,757,632 B2 | 9/2017 | Fryer et al. |
| D839,976 S | 2/2019 | Legoski |
| D863,476 S | 10/2019 | Haarburger |
| D889,057 S | 6/2020 | Steinkraus |
| 2012/0042860 A1* | 2/2012 | McCann .............. A63B 65/122 124/5 |
| 2013/0186381 A1* | 7/2013 | Hansen ................ A01K 15/025 124/5 |

* cited by examiner

BALL THROWING DEVICE

RELATED APPLICATIONS AND CLAIM OF PRIORITY

This patent document claims priority to U.S. Provisional Patent Application No. 62/824,469, filed Mar. 27, 2019, the disclosure of which is fully incorporated into this document by reference.

FIELD OF THE INVENTION

The present disclosure relates generally to throwing devices and, more particularly, to ball throwing devices having a lever with a plurality of latitudinal bends for increased strength, efficiency, and energy.

BACKGROUND

Ball throwing devices have long been used for play with pets, sports training, etc. Many of these throwing devices utilize an elongated, slightly-curvilinear lever arm having a handle portion at a proximal end and a ball attachment cup a distal end. Due to the elongated nature of the lever arm, the throwing device becomes an extension of the user's own arm, enabling the user to throw the ball a greater distance and/or at a greater speed without the need for increased speed or power on their conventional throwing motion.

However, in conventional throwing devices, the throwing distance of the ball is in direct relation to the length of the elongated lever arm. Thus, in order for the user to achieve greater throwing distances, they may need to purchase throwing devices having long lever arms, which are inconvenient to transport and more difficult to control.

Accordingly, devices that are intended to address the issues discussed above and/or other issues are disclosed herein.

SUMMARY

In accordance with one aspect of the disclosure, a ball throwing device is disclosed. The ball throwing device may include a lower handle portion, a middle lever portion, and a head portion. The middle lever portion may include a plurality of latitudinal bends. The plurality of latitudinal bends may be positioned between the lower handle portion and the head portion.

A ball throwing device in accordance with another aspect of the disclosure is disclosed. The ball throwing device may include a lower handle portion, a middle lever portion, and a head portion. The head portion may include a half-spherical cup. The half-spherical cup may be configured to releasably retain a ball. The half-spherical cup may also include a plurality of edge lobes configured to flex over an outside diameter of the ball.

DETAILED DESCRIPTION

Figure 1:
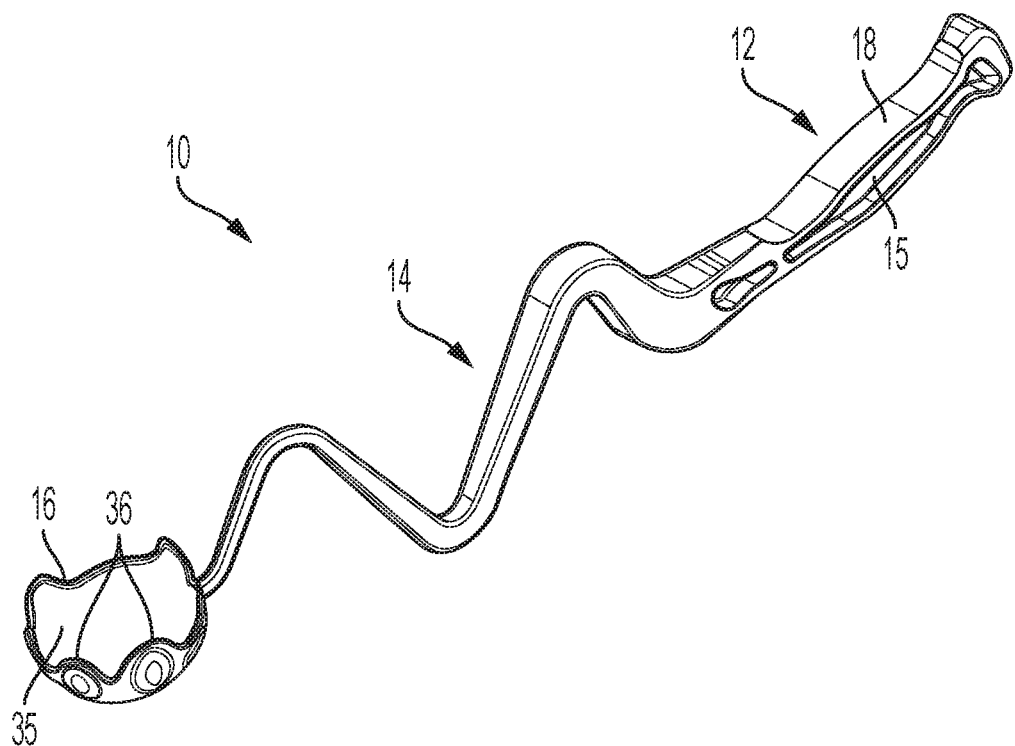
FIG. 1 is a bottom perspective view of the ball throwing device in accordance with an aspect of the disclosure.
Figure 2:
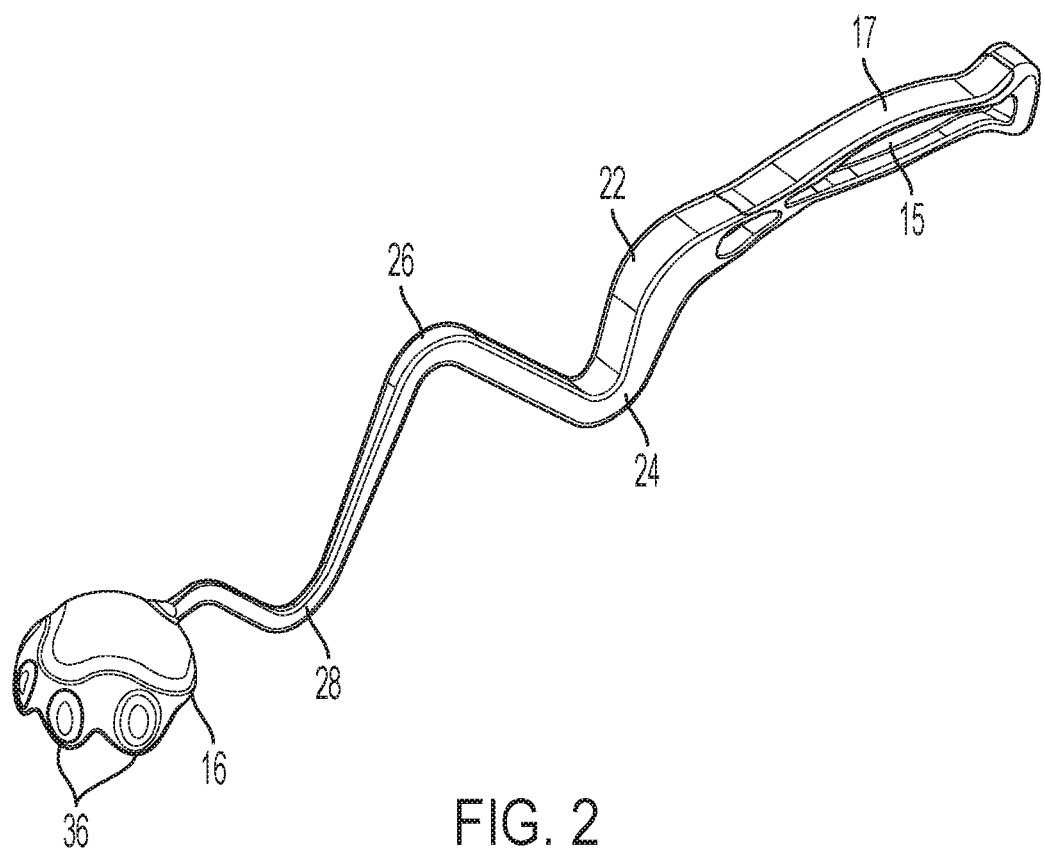
FIG. 2 is a top perspective view of the ball throwing device of FIG. 1.
Figure 3:
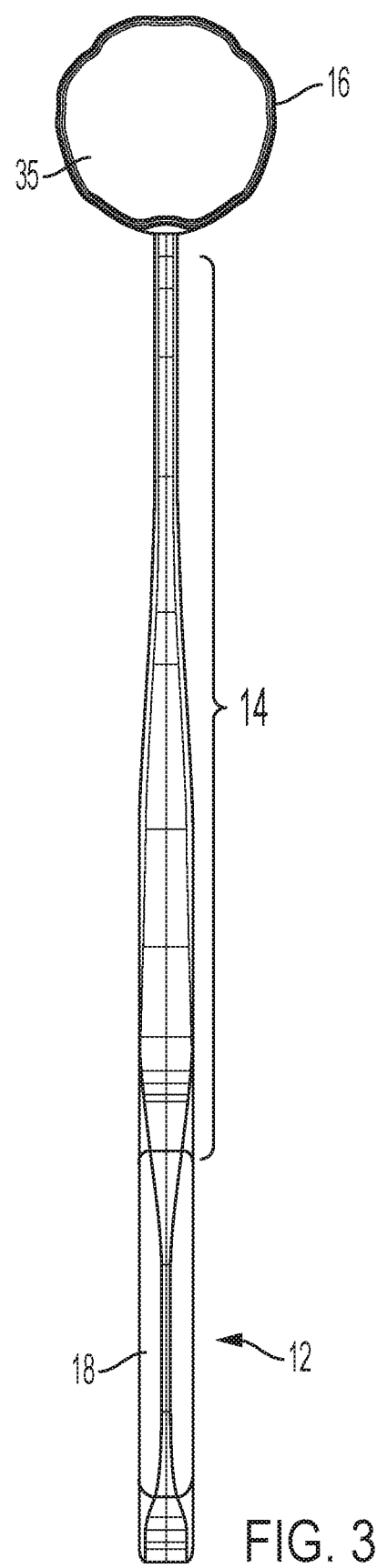
FIG. 3 is a front elevation view of the ball throwing device of FIG. 1.

The following description is made for the purpose of illustrating the general principles of the present apparatus and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a ball throwing device is oriented as shown in the Figures.

Referring to FIGS. 1-4, a ball throwing device 10 in accordance with an aspect of the disclosure is illustrated. Ball throwing device 10 includes an integral lower handle portion 12, a middle lever portion 14, and a head portion 16. As is shown in FIGS. 1-7, head portion 16 may be configured as a substantially half-spherical cup, as will be described in further detail below. In some embodiments, ball throwing device 10 is formed of a flexible, high-impact plastic material capable of returning to shape when bent such as, e.g., polypropylene, nylon, polycarbonate, etc. However, it is to be understood that ball throwing device 10 may be formed of any appropriate material or combination of materials.

The lower handle portion 12 includes an upper handle segment 17 and a lower handle segment 18. In some embodiments, both upper handle segment 17 and lower handle segment 18 are individual components formed of a thermoplastic elastomer (TPE) and over-molded onto the lower handle portion 12 of the ball throwing device 10, with upper handle segment 17 and lower handle segment 18 being contoured and shaped so as to provide an ergonomically pleasing grip for a user's hand. Additionally, the TPE used to mold the upper handle segment 17 and lower handle segment 18 may serve to provide a comfortable, non-slip grip of the ball throwing device 10. In some embodiments, the length of the lower handle portion 12 may range from 3 to 6 inches. Furthermore, in some embodiments, lower handle portion 12 may include recessed pockets 15 one or both sides, which may reduce the weight of the ball throwing device 10 and enable the ball throwing device 10 to be manufactured with less material.

Referring still to FIGS. 1-4, the middle lever portion 14 of the ball throwing device 10 extends from the lower handle portion 12. Middle lever portion 14 may include a rectangular cross-section 20 which reduces in area as it nears the head portion 16, as shown in FIGS. 5A-5C. For improved strength and rigidity, the longer end of the rectangular cross-section 20 may be positioned latitudinally in-line with the overall length of the ball throwing device 10.

Figure 4:
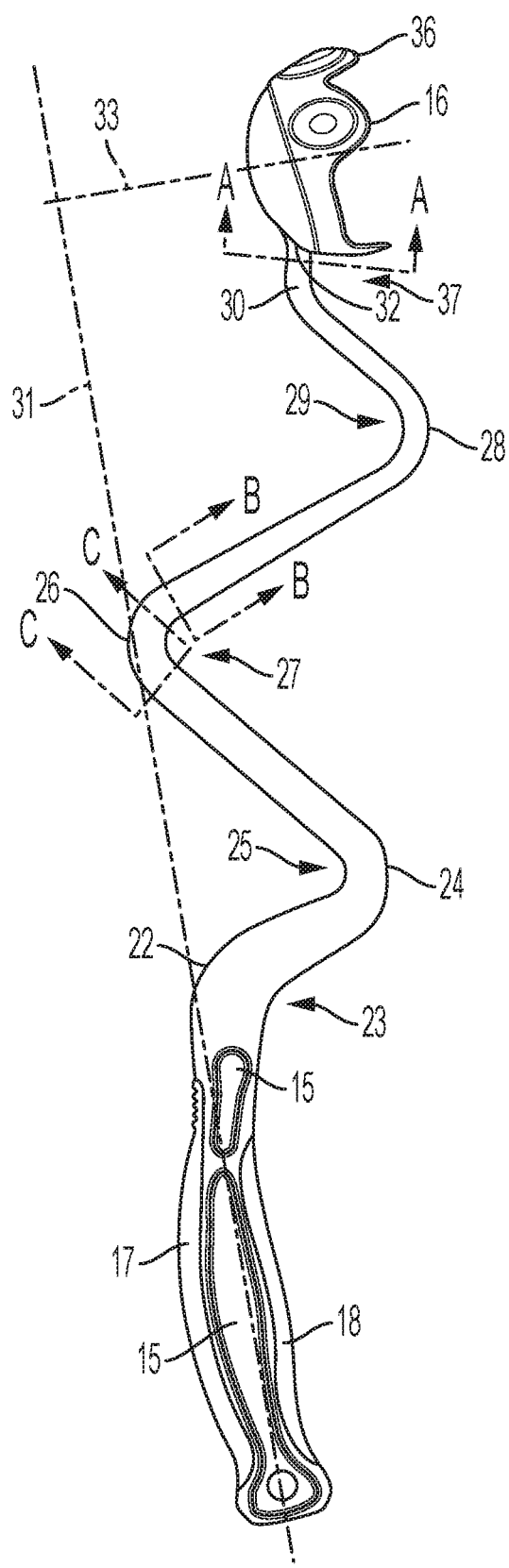
FIG. 4 is a side elevation view of the ball throwing device of FIG. 1.
Figure 5A:
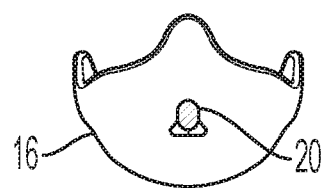
FIG. 5A is a cross section view of the ball throwing device of FIG. 4 at point A-A.
Figure 5B:
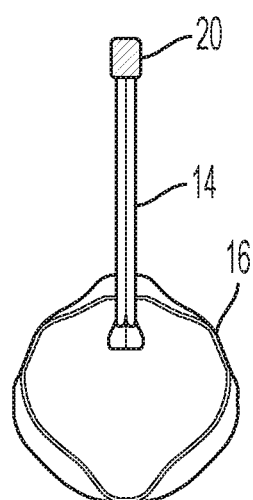
FIG. 5B is a cross section view of the ball throwing device of FIG. 4 at point B-B.
Figure 5C:
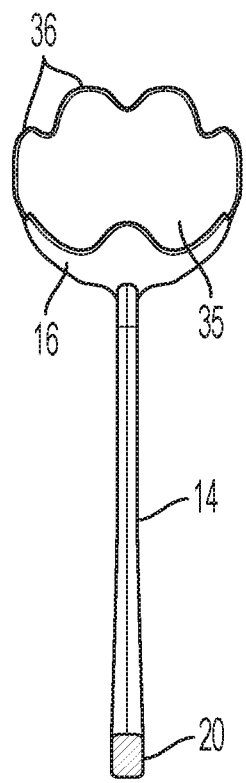
FIG. 5C is a cross section view of the ball throwing device of FIG. 4 at point C-C.

As is shown in FIG. 4, a plurality of latitudinal bends are provided along the length of middle lever portion 14. A first latitudinal bend 22 that begins to define the middle lever portion 14 profile may be located just above the lower handle portion 12. In some embodiments, the angle of the first latitudinal bend 22 may range from, e.g., 30 to 60 degrees, and may include a radius 23 that provides strength and enables the middle lever portion 14 to flex along the first latitudinal bend 22 while still retaining memory of the starting angle.

A second latitudinal bend 24 that continues to define the middle lever portion 14 profile may be located, e.g., 1 to 3 inches in distance from the first latitudinal bend 22. In some embodiments, the angle of the second latitudinal bend 24 may range from, e.g., 10 to 50 degrees, and may include a radius 25 that also provides strength and allows the middle lever portion 14 to flex along the second latitudinal bend 24 but retain memory of the starting angle.

The middle lever portion 14 profile may extend from the second latitudinal bend 24 a distance of, e.g., 3 to 6 inches to a third latitudinal bend 26. The angle of the third latitudinal bend 26 may range from, e.g., 10 to 50 degrees, and may include a radius 27 that, like radius 23 and radius 25, provides strength and allows the middle lever portion 14 to flex along the third latitudinal bend 26 while retaining memory of the starting angle.

The middle lever portion 14 profile may also extend from the third latitudinal bend 26 a distance of, e.g., 3 to 6 inches to a fourth latitudinal bend 28. The angle of the fourth latitudinal bend 28 may range from, e.g., 10 to 50 degrees, and may include a radius 29 that may provide increased strength and allow the middle lever portion 14 to flex along the fourth latitudinal bend 28 while retaining memory of the starting angle.

Additionally, the middle lever portion 14 profile may extend from the fourth latitudinal bend 28 a distances of, e.g., 1 to 3 inches to a fifth latitudinal bend 30. The fifth latitudinal bend 30 may range from, e.g., 30 to 60 degrees, and may be configured to adjust the profile of the middle lever portion 14 so that the angle of a longitudinal axis 31 of the lower handle portion 12 is perpendicular to an axis 33 of the head portion 16. As with the other latitudinal bends described above, the fifth latitudinal bend 30 may include a radius 37 that provides strength and allows the middle lever portion 14 to flex along the bend but retain memory of the starting angle.

As the radii at each consecutive angle of the middle lever portion 14 flex and return to their original shape, the cumulative movement may provide additional energy to the ball throwing device 10 that has traditionally been achieved by increasing length of the middle lever portion. The overall length of the middle lever portion 14 may measure, e.g., 8 to 16 inches from the end of the lower handle portion 12 to the head portion 16, which is significantly shorter than many devices designed for long-distance ball throwing. In this way, ball throwing device 10 is capable of throwing a ball longer distances due to the curving, spring-like profiles of the latitudinal bends, as opposed to simply relying upon an elongated overall length of a lever arm, as has been done previously.

While FIGS. 1-4 illustrate middle lever portion 14 as having five latitudinal bends, it is to be understood that the ball throwing device 10 may utilize more or fewer latitudinal bends in accordance with the disclosure. Additionally, the latitudinal bends may vary in angular range as opposed to that which is described above with respect to FIGS. 1-4.

Figure 6:
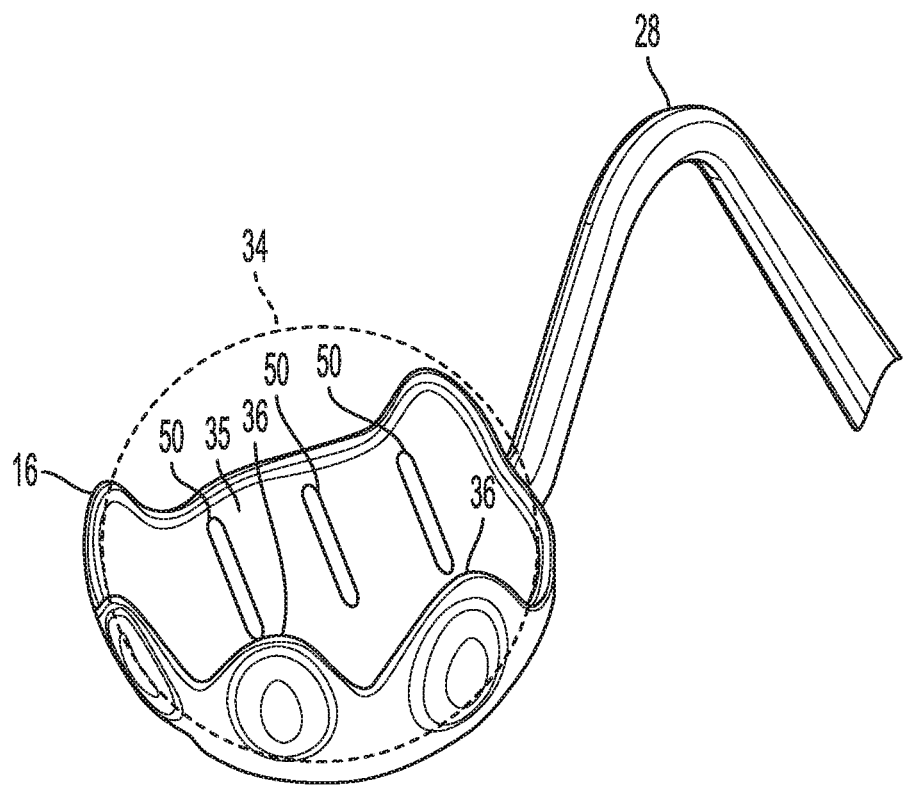
FIG. 6 is a top perspective view of the head of the ball throwing device holding a ball in accordance with an aspect of the disclosure.
Figure 7:
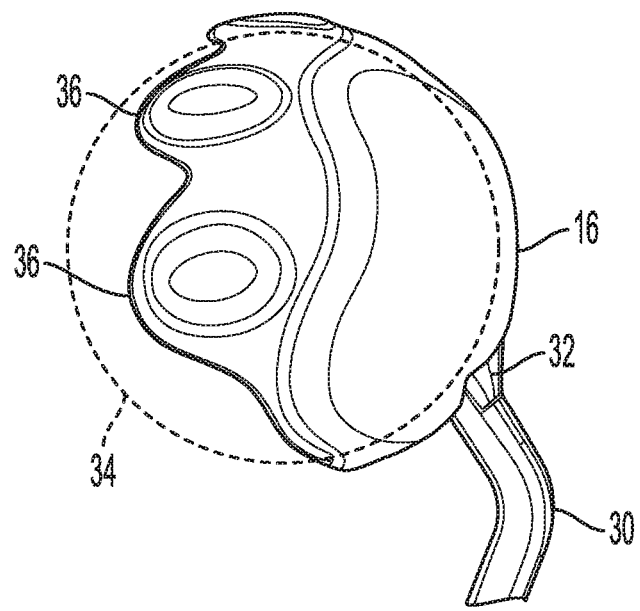
FIG. 7 is a bottom perspective view of the head of the ball throwing device holding a ball in accordance with an aspect of the disclosure.

Next, referring to FIGS. 6-7, the head portion 16 is integrally formed to the middle lever portion 14. For added strength and resistance to wear over time, reinforcement gussets 32 may be provided at or near the location where the middle lever portion 14 integrally connects to the head portion 16. In some embodiments, the inside diameter of the substantially half-spherical head portion 16 is sized to receive a ball 34 via an open end 35. The ball 34 may be, e.g., a standard tennis ball. However, it is to be understood that head portion 16 may be sized to fit balls larger or smaller than a standard tennis ball.

Referring still to FIGS. 6-7, a series of edge lobes 36 extend from the inside diameter of the open end 35 of half-spherical head portion 16. One or more of the edge lobes 36 may extend slightly past center, which may aid in containing the ball 34 within the head portion 16. The edge lobes 36 are configured to flex over the outside diameter of the ball 34, allowing the ball 34 to be contained and held in place. Additionally and/or alternatively, it is to be understood that the head portion 16 may further include one or more slots 50 formed along a radial surface of the head portion 16. The one or more slots 50 may extend any appropriate distance (e.g., 1 inch, 1.5 inches, etc.), terminating, for example, at one or more locations between edge lobes 36. The one or more slots 50 may provide for additional flex in the head portion 16 when a ball 34 is secured therein, allowing for head portion 16 to more loosely grip the ball 34, while still allowing the head portion 16 to flex over the outside of the ball 34, thereby holding the ball 34 in place.

During use, the user may swing the ball throwing device 10 in a back-to-forward direction along its longitudinal axis, abruptly stopping the throwing motion when the open end 35 of head portion 16 is facing forward. Accordingly, as described above, the energy of the middle lever portion 14 is released into the ball 34, effectively propelling ball 34 through the air with more force that is possible when throwing the ball by hand and/or by a substantially-straight or slightly curvilinear ball throwing device of a similar length.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A ball throwing device comprising:
a lower handle portion;
a middle lever portion; and
a head portion,
wherein the head portion comprises a half-spherical cup configured to releasably retain a ball, the half-spherical cup having a plurality of edge lobes configured to flex over an outside diameter of the ball,
wherein the middle lever portion comprises a plurality of latitudinal bends positioned between the lower handle portion and the head portion and comprises a first latitudinal bend, a second latitudinal bend, a third latitudinal bend, a fourth latitudinal bend, and a fifth latitudinal bend.

2. The ball throwing device of claim 1, wherein the angle of the first latitudinal bend is between 30 and 60 degrees.

3. The ball throwing device of claim 1, wherein the angle of the second latitudinal bend is between 10 and 50 degrees.

4. The ball throwing device of claim 1, wherein the angle of the third latitudinal bend is between 10 and 50 degrees.

5. The ball throwing device of claim 1, wherein the angle of the fourth latitudinal bend is between 10 and 50 degrees.

6. The ball throwing device of claim 1, wherein the angle of the fifth latitudinal bend is between 30 and 60 degrees.

7. The ball throwing device of claim 1, wherein one or more of the lower handle portion, the middle lever portion, and the head portion are formed of polypropylene, nylon, or polycarbonate.

8. The ball throwing device of claim 1, wherein the lower handle portion further comprises an upper handle segment and a lower handle segment to form a grip for a user of the ball throwing device.

9. The ball throwing device of claim 8, wherein the upper handle segment and the lower handle segment are formed of a thermoplastic elastomer.

10. The ball throwing device of claim 1, wherein the lower handle portion further comprises one or more recessed pockets.

11. The ball throwing device of claim 1, wherein the head portion comprises a half-spherical cup configured to releasably retain a ball.

12. The ball throwing device of claim 11, wherein the half-spherical cup comprises a plurality of edge lobes configured to flex over an outside diameter of the ball.

13. The ball throwing device of claim 1, wherein a rectangular cross-section of the middle lever portion reduces in area between the lower handle portion and the head portion.

14. The ball throwing device of claim 1, further comprising one or more reinforcement gussets positioned between the middle lever portion and the head portion.

15. The ball throwing device of claim 1, wherein the half-spherical cup further comprises one or more slots formed along a radial surface thereof.

* * * * *